United States Patent [19]

Jensen et al.

[11] 4,147,016
[45] Apr. 3, 1979

[54] HARVESTER HAVING HEIGHT ADJUSTABLE HEAD

[75] Inventors: James K. Jensen, Ankeny; Joe H. Hoeksema, Des Moines, both of Iowa

[73] Assignee: Deere & Company, Moline, Ill.

[21] Appl. No.: 758,909

[22] Filed: Jan. 13, 1977

[51] Int. Cl.$^2$ .............................................. A01D 45/18
[52] U.S. Cl. ..................................... 56/15.8; 56/10.4; 56/34
[58] Field of Search ...................... 56/33, 34, 208, 209, 56/10.4, 15.8

[56] References Cited

U.S. PATENT DOCUMENTS

| | | | |
|---|---|---|---|
| 1,105,915 | 8/1914 | Monk | 56/34 |
| 1,789,803 | 1/1931 | Boone | 56/34 |
| 3,380,232 | 4/1968 | Jezek | 56/34 |
| 3,509,700 | 5/1970 | Jezek | 56/34 |
| 3,535,859 | 10/1970 | Adams | 56/10.4 |
| 3,611,681 | 10/1971 | Blanton et al. | 56/10.4 |
| 3,729,909 | 5/1973 | Gray et al. | 56/34 |
| 3,731,470 | 5/1973 | Cornish et al. | 56/10.4 |

*Primary Examiner*—Russell R. Kinsey
*Attorney, Agent, or Firm*—Fraser and Bogucki

[57] ABSTRACT

An arrangement of parallel fingers within the head of a cotton stripper is twisted in response to the operation of a pair of supporting cylinders disposed between the head and a vehicle frame to which the head is pivotably mounted to vary the heights of the opposite ends of the arrangement of parallel fingers in response to height sensors mounted at the opposite ends. The parallel fingers are mounted on an elongated tubular structure which extends between and is attached to the opposite ends of the head and which twists in response to the action of the cylinders and the weight of the head to twist the normally planar arrangement of parallel fingers. Transversely mounted stalk walker and feeder shafts in the region of the fingers are journaled in universal bearings at the opposite ends of the head to permit distortion of the head and twisting of the arrangement of parallel fingers. The opposite height sensors are coupled to operate a pair of valves included in separate circuits from a common source of pressurized fluid to vary the fluid pressure at the cylinders which are also coupled to the circuits, thereby adjusting the height of each end of the array of parallel fingers in accordance with the height sensor at that end and independently of the other end of the finger arrangement. The valves can also be adjusted independently of the action of the sensors in response to external commands such as from the operator of the cotton stripper by an arrangement which varies the position of linkage which is coupled to the height sensors relative to the actuating plungers of the valves.

25 Claims, 10 Drawing Figures

HARVESTER HAVING HEIGHT ADJUSTABLE HEAD

BACKGROUND OF THE INVENTION

1. Field of the Invention

The present invention relates to harvesting or crop treating equipment, and more particularly to cotton strippers of the type in which a plurality of stripping fingers are mounted in parallel, spaced-apart relation and are driven through cotton plants to strip the cotton bolls from the plants.

2. History of the Prior Art

The prior art contains various examples of arrangements for adjusting the height of and otherwise positioning crop harvesting apparatus. For example, in U.S. Pat. No. 3,714,767, Hubbard et al, CROP HARVESTER, issued Feb. 6, 1973 and assigned to the assignee of this application, a pair of harvesting units are individually adjusted for height. Each unit employs a system using a sensor in combination with a valve, a supply of pressurized fluid and a cylinder which responds to the pressurized fluid as controlled by the valve to adjust the height of the associated unit.

U.S. Pat. No. 3,714,767 is typical of crop harvesting equipment of the type in which one or more cylindrical structures rotatable about vertical axes are employed to perform the harvesting. Other examples include U.S. Pat. No. 3,359,712, Hubbard, COTTON PICKER, issued Dec. 26, 1967, U.S. Pat. No. 3,369,352, Hubbard, COTTON PICKER, issued Feb. 20, 1968, U.S. Pat. No. 3,373,547, Hubbard, COTTON PICKER, issued Mar. 19, 1968 and U.S. Pat. No. 3,427,791, Hubbard, METHOD AND APPARATUS FOR POSITIONING DOFFING STRUCTURE IN A COTTON PICKER, issued Feb. 18, 1969, each of the Hubbard patents being assigned to the assignee of this application.

A different height sensing and adjusting arrangement is shown in U.S. Pat. No. 3,643,407, Hubbard et al, AUTOMATIC HEIGHT ADJUSTMENT OF CROP HARVESTER, issued Feb. 22, 1972 and assigned to the assignee of this application. In Pat. No. 3,643,407 two different systems are used in conjunction with two different cylinders, the first cylinder providing basic height positioning and the second cylinder providing minor adjustment of the height.

Other types of crop harvesting equipment for use with crops such as cotton employ a plurality of parallel, spaced-apart fingers for stripping the cotton bolls from the plants, as shown for example in U.S. Pat. No. 3,413,784, Jezek, COTTON STRIPPING APPARATUS, issued Dec. 3, 1968. Further examples of this type of apparatus are provided by U.S. Pat. No. 3,757,502, Hubbard, COTTON HARVESTER, issued Sept. 11, 1973 and assigned to the assignee of this application, and U.S. Pat. No. 3,509,700, Jezek, COTTON STRIPPING APPARATUS, issued May 5, 1970.

The above examples of crop harvesting equipment employ a variety of different arrangements for adjusting the height of the harvesting heads relative to the ground. In the case of cotton pickers having rotatable cylindrical picking apparatus, vertical adjustment of each cylinder or drum can typically be made without regard for height adjustments of one side of the drum relative to the other because of the relatively small lateral dimensions of the drum. In those arrangements where cotton stripping fingers are employed, the commonly mounted fingers are typically provided with a single height adjustment achieving a desired nominal or average height of the fingers. However, as such arrangements are made larger, particularly in the transverse direction, and as increasing demands are placed on such equipment for speed and accuracy, a single height adjustment is often found to be inadequate. For example, a single height adjustment fails to compensate for variations in terrain which may place one end of the stripper fingers at approximately the desired height above the ground while the other end of the stripper fingers is at a different and unwanted height.

One approach to the problem of providing relative variations in the height of opposite ends of relatively large crop harvesting equipment is shown in U.S. Pat. No. 3,981,125 to Kerber et al entitled LEVELING MECHANISM FOR HARVESTER HEADERS, issued Sept. 21, 1976. In Kerber et al a mechanism causes a supporting feeder housing to distort, providing a side-to-side rocking motion of an attached harvester platform. The resulting pivoting motion of the harvester platform about a longitudinal axis provides for relative variations in the heights of the opposite ends of the platforms. The difficulty with such an arrangement lies in the fact that the arrangement itself is nothing more than a pivoting arrangement and does not perform actual height adjustment as such. For example, it is impossible to maintain one end of the platform at a fixed desired height while varying the other end of the platform since adjustment of the platform angle necessitates changes in the heights of both ends. A further limitation resides in the fact that the procedure involved in changing the angle of the platform is a relatively involved and time consuming one which does not lend itself to frequent adjustments in the relative heights of the various portions to the harvester platform as varying terrain is encountered.

Accordingly, it is an object of the present invention to provide crop harvesting equipment having improved height adjusting arrangements in accordance with the invention.

A further object of the invention is to provide crop harvesting equipment in which the opposite ends of a harvesting head are adjustable in height independent of one another so as to position each of the opposite ends of the head at desired heights above the ground.

A still further object of the invention is the provision of a cotton stripper in which the opposite ends of a generally planar array of parallel, spaced-apart stripping fingers are individually and independently adjustable to a desired height.

BRIEF DESCRIPTION OF THE INVENTION

Crop harvesting equipment in accordance with the invention includes a generally planar array of crop treating elements which is twistable so as to distort the array and thereby vary the heights of the opposite ends of the array relative to one another. Each end of the array is provided with its own height sensor which varies the fluid pressure at adjustable means mounted between the end of the array of crop treating elements and the frame of a vehicle which carries such elements. Unequal variations in the adjustable means result in twisting of the array of crop treating elements so as to position the opposite ends thereof at the desired heights. The twisting motion is possible because of the design of the housing for the array of crop treating elements which includes an elongated twistable mounting member extending between and coupled to opposite ends of the housing and having the crop treating elements mounted thereon along the length thereof. The opposite ends of the housing are pivotably mounted on the vehicle frame to permit vertical movement of the housing. As the adjustable means are varied in response to their respective height sensors, the elongated mounting member undergoes twisting motion resulting in twisting of the array of crop treating elements.

In a preferred embodiment of crop treating apparatus according to the invention which comprises a cotton stripper, a plurality of cotton stripping fingers are mounted in parallel, spaced-apart relation along the length of a tube having its opposite ends secured to the opposite ends of a housing for the head of the apparatus. A different sensor mounted on each of the opposite ends of the array of stripper fingers varies one of a pair of valves accordingly. The valves are included in circuits coupled to a source of pressurized fluid so as to vary the pressure in respective ones of a pair of cylinders extending between opposite ends of the elongated tube of the head and a hollow, auger-containing housing mounted on a frame extending from a vehicle. The auger housing has opposite ends on which are pivotably mounted the opposite ends of the housing for the head. The cylinders respond to variations in fluid pressure as provided by the respective height sensors to vary the length thereof and thereby the distance between the associated end of the elongated tube and the auger housing. Variations in the distances result in twisting of the tube so as to twist or distort the generally planar array of stripper fingers which are mounted on the tube. The cylinders can be adjusted independently of the height sensors in response to external commands such as from the operator of the vehicle by an arrangement which varies the position of linkage which is coupled to the height sensors relative to mechanical actuators for the valves. Such arrangement preferably includes rotatable cylindrical elements which when rotated move the pivot points of elements forming part of the height sensing linkage toward or away from the mechanical actuators of the valves.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 4 is a left side view of the head and auger housing portion of FIG. 3 as seen from the line 4—4 of FIG. 1;

DETAILED DESCRIPTION

Figure 1:
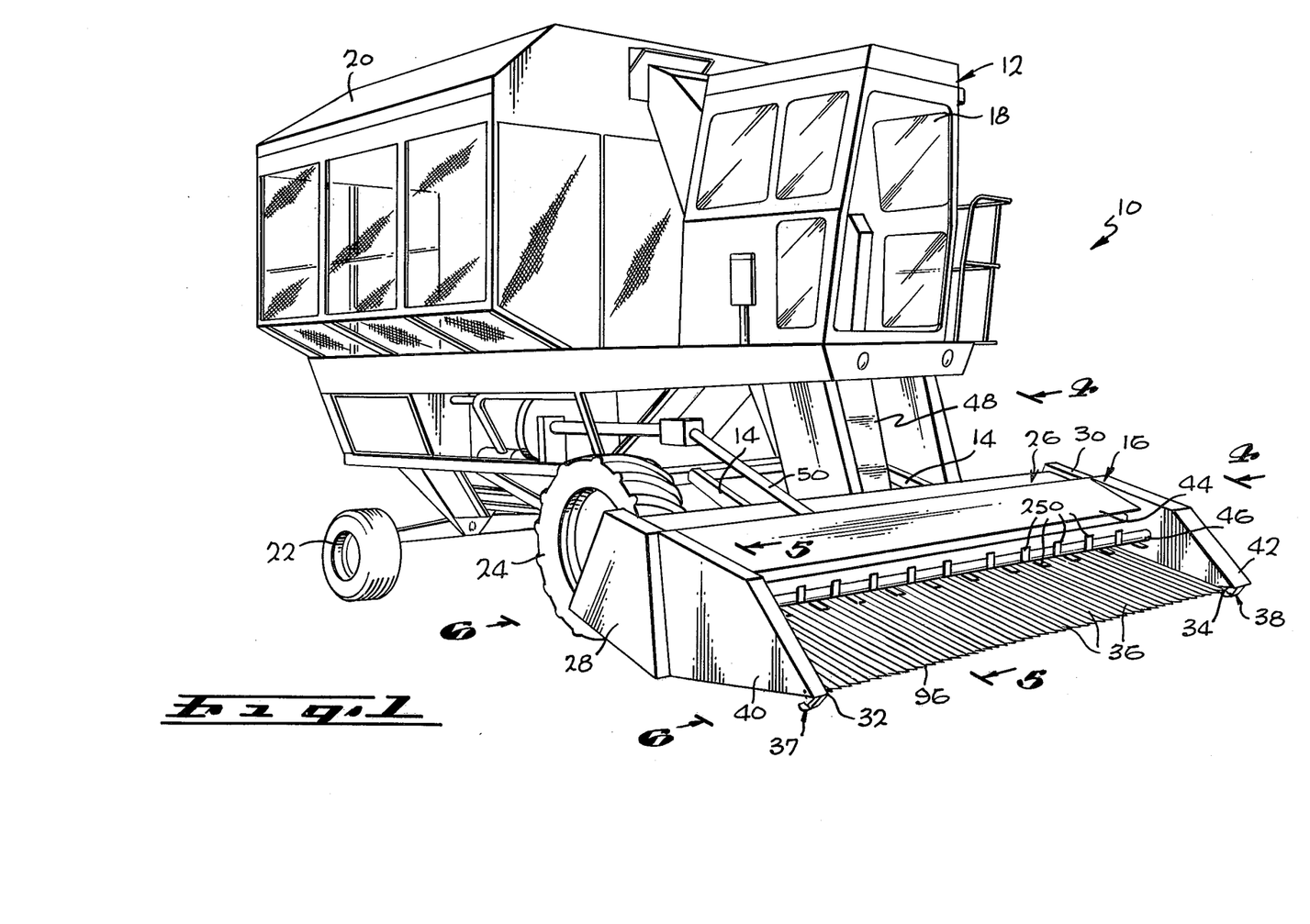
FIG. 1 is a perspective view of a cotton stripper according to the invention.

FIG. 1 shows a cotton stripper 10 in accordance with the invention. The cotton stripper 10 is comprised of a vehicle 12 having a frame 14 extending therefrom and mounting a head 16. The vehicle 12 is self-powered and includes a cab 18 for housing the operator and a storage bin 20. The vehicle 12 is supported by a pair of rear wheels 22 and a pair of front wheels 24 (only one of which is shown in FIG. 1).

The frame 14 includes a hollow, auger-containing housing 26 mounted at the outer end thereof opposite the vehicle 12. While not shown in FIG. 1, the housing 26 has opposite pivot points at opposite ends 28 and 30 thereof pivotably mounting the head 16 thereon and defining a reference axis. As described hereafter in connection with FIG. 10 the frame 14 is pivotably coupled to the vehicle 12 and is adjustable to position the housing 26 at a selected nominal height relative to the ground. The head 16 is then pivoted relative to the housing 26 about a generally horizontal axis and twisted along the length thereof about an axis generally normal to the generally horizontal axis as necessary to position the opposite ends 32 and 34 of a generally planar array of spaced-apart parallel stripping fingers 36 at selected heights above the ground. The height of each end 32 and 34 is determined by an associated height sensor 37 and 38 respectively mounted on each of the opposite ends 40 and 42 of a hollow housing 44 for the head 16.

As the cotton stripper 10 moves in the forward direction over the ground the cotton plants pass between the fingers 36 and the cotton bolls are removed from the plants by the fingers with the aid of stalk walker and feeder shafts, the stalk walker shaft acting to force the stalks of the cotton plants downwardly to aid in stripping of the cotton bolls therefrom by the fingers 36 and the feeder shafts. One of the feeder shafts 46 which is shown in FIG. 1 extends across the head 16 with the opposite ends thereof being rotatably journaled in universal bearings in the opposite ends 40 and 42. Cotton bolls stripped from the plants by the head 16 are advanced to an auger within the housing 26 where they are directed from the opposite sides of the housing 26 toward the center for transfer via a chute 48 to the storage bin 20. The bin 20 may be periodically tipped over relative to the frame of the vehicle 12 to empty the cotton bolls therefrom. The feeder shaft 46 and other parts of the head 16 are driven by a drive arrangement extending from the vehicle 12 and including a drive shaft 50.

Figures 2, 5:
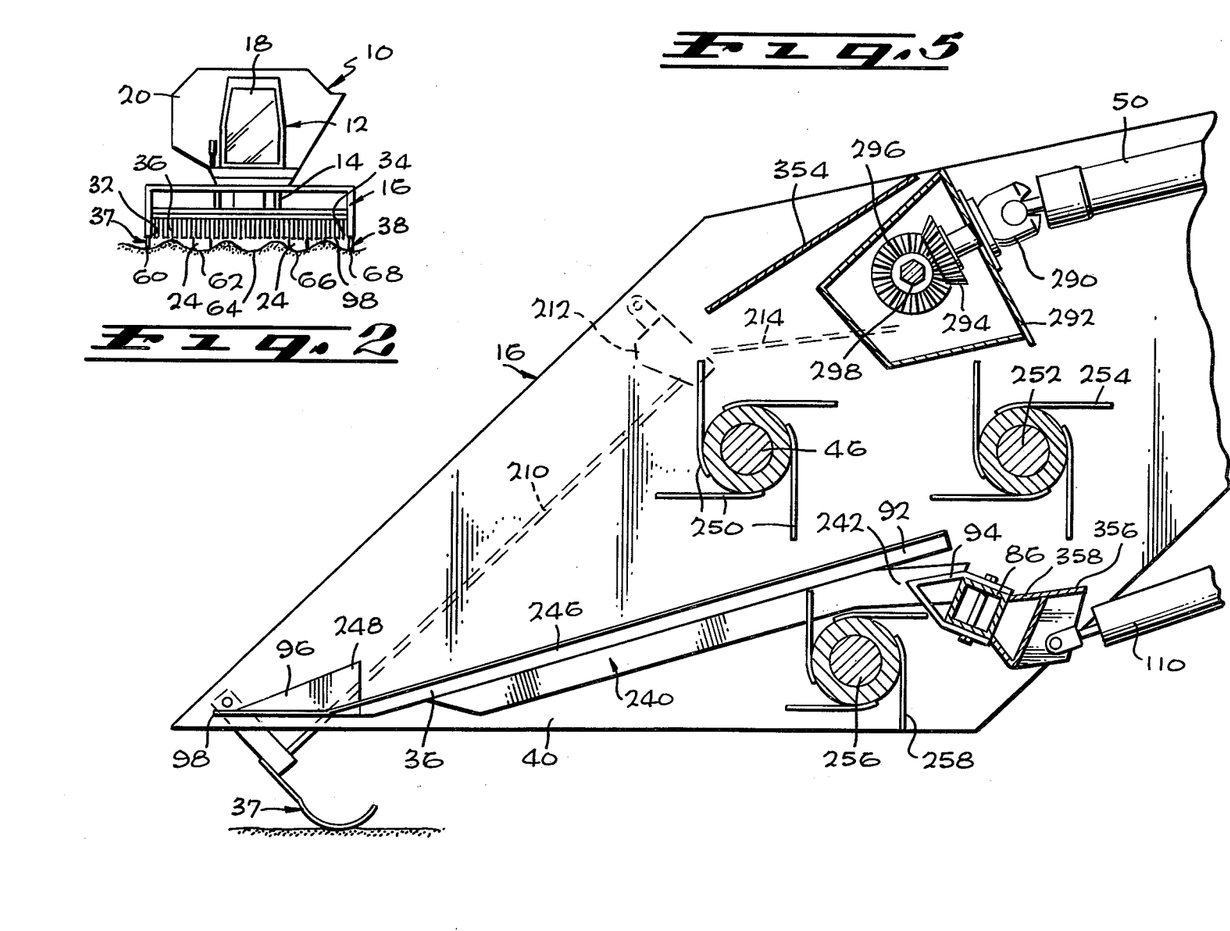
FIG. 2 is a front view of the cotton stripper of FIG. 1 illustrating the relationship of the sizes of various portions of the stripper to one another and to the sizes of typical furrows in the ground.
FIG. 5 is a sectional view of the head and auger housing portion of FIG. 3 taken along the line 5—5 of FIG. 1.

FIG. 2 shows the cotton stripper 10 positioned relative to the plural furrows of a field for stripping. In the present example, the head 16 has a width equal to that of four furrows and extends from the bottom of a first furrow 60 across second, third and fourth furrows 62, 64 and 66 respectively to the bottom of a fifth furrow 68. The front wheels 24 of the vehicle 12 span the width of two furrows and reside within the furrows 62 and 66. The height sensors 37 and 38 reside within the furrows 60 and 68 respectively. In accordance with the invention the height sensor 37 positions the adjacent end 32 of the array of fingers 36 at a selected height above the bottom of the furrow 60 independently of the height of the opposite end 34 of the array of fingers. Likewise, the height sensor 38 positions the end 34 a selected height above the bottom of the furrow 68 independent of the height of the end 32 of the array of fingers 36.

Where necessary the generally planar array of fingers 36 undergoes twisting to permit the opposite ends 32 and 34 thereof to be positioned at the selected heights determined respectively by the height sensor 37 and 38. This enables the cotton stripper 10 to position the outer tips of the fingers 36 to provide for the most efficient and effective use of the stripper independent of irregularities and other variations in the ground. For best results the tips of the fingers 36 should be positioned a relatively small distance on the order of an inch or two above the tops of the furrows. Positioning of the tips of the fingers 36 higher than this results in failure of the cotton stripper 10 to strip a considerable amount of cotton from the lower portions of the cotton plants. On the other hand finger tips which are too close to the tops of the furrows may dig into the furrows so as to bind the fingers 36 and cause possible damage thereto.

The details of the head 16 and the adjacent portion of the housing 26 are shown in FIGS. 3–6. The end 40 of the head 16 extends inside of and is pivotably mounted on the end 28 of the housing 26 by a cylindrical pin 80 mounted on and extending inwardly from the end 28. The opposite end 42 of the head 16 extends inside of and is pivotably mounted on the end 30 of the housing 26 by a generally cylindrical pin 82 mounted on and extended inwardly from the end 30. The pins 80 and 82 define a reference axis 84.

The housing 44 of the head 16 includes an elongated tube 86 of generally square cross-section disposed generally parallel to the reference axis 84 and having opposite ends 88 and 90 thereof respectively secured to the ends 40 and 42 such as by welding. Each of the cotton stripping fingers 36 has a first end 92 mounted on the tube 86 via a bracket 94 and an opposite second end 96 disposed at the front of the head 16. The first ends 92 of the fingers 36 are mounted in spaced-apart relation along the length of the tube 86 and lie generally on the axis of the tube 86 which remains parallel to the reference axis 84. The opposite ends 96 of the fingers 36 are spaced-apart along a harvesting axis 98 extending between the ends 32 and 34. The tube 86 is capable of undergoing twisting motion so as to raise or lower one of the ends 32, 34 relative to the other end. This results in twisting or distortion of the generally planar array of fingers 36 accompanied by a change in the angle of the harvesting axis 98 relative to the axis of the tube 86 and the reference axis 84.

The twisting motion of the head 16 is made possible by the pivotable mounting of the head 16 at the pins 80 and 82, the fact that the tube 86 can undergo some twisting, the fact that the opposite ends 40 and 42 of the head 16 are thin and therefore somewhat flexible, and the manner in which the bottom portion of the head 16 including the tube 86 is supported relative to the housing 26. Such support is accomplished by a spaced-apart pair of hydraulic cylinders 110 and 112 disposed on the inside of and adjacent the opposite ends 40 and 42 respectively and extending between the opposite ends 88 and 90 respectively of the tube 86 and the opposite ends 114 and 116 respectively of an elongated support beam 118. The support beam 118 which is parallel to the reference axis 84 extends between and has the opposite ends 114 and 116 thereof mounted on the opposite ends 28 and 30 respectively of the housing 26. The beam 118 has a front surface receiving the ends of the cylinders 110 and 112 and which thereby defines a reference surface for the head 16. As described hereafter, the cylinder 110 operates in response to the height sensor 37 to vary the distance of the end 88 of the tube 86 relative to the beam 118 and thereby vary the height of the end 32 of the head 16 accordingly. This is done independently of the cylinder 112 which responds to the height sensor 38 independent on the sensor 37 and the cylinder 110 to vary the distance of the end 90 of the tube 86 relative to the beam 118.

Figures 6, 9:
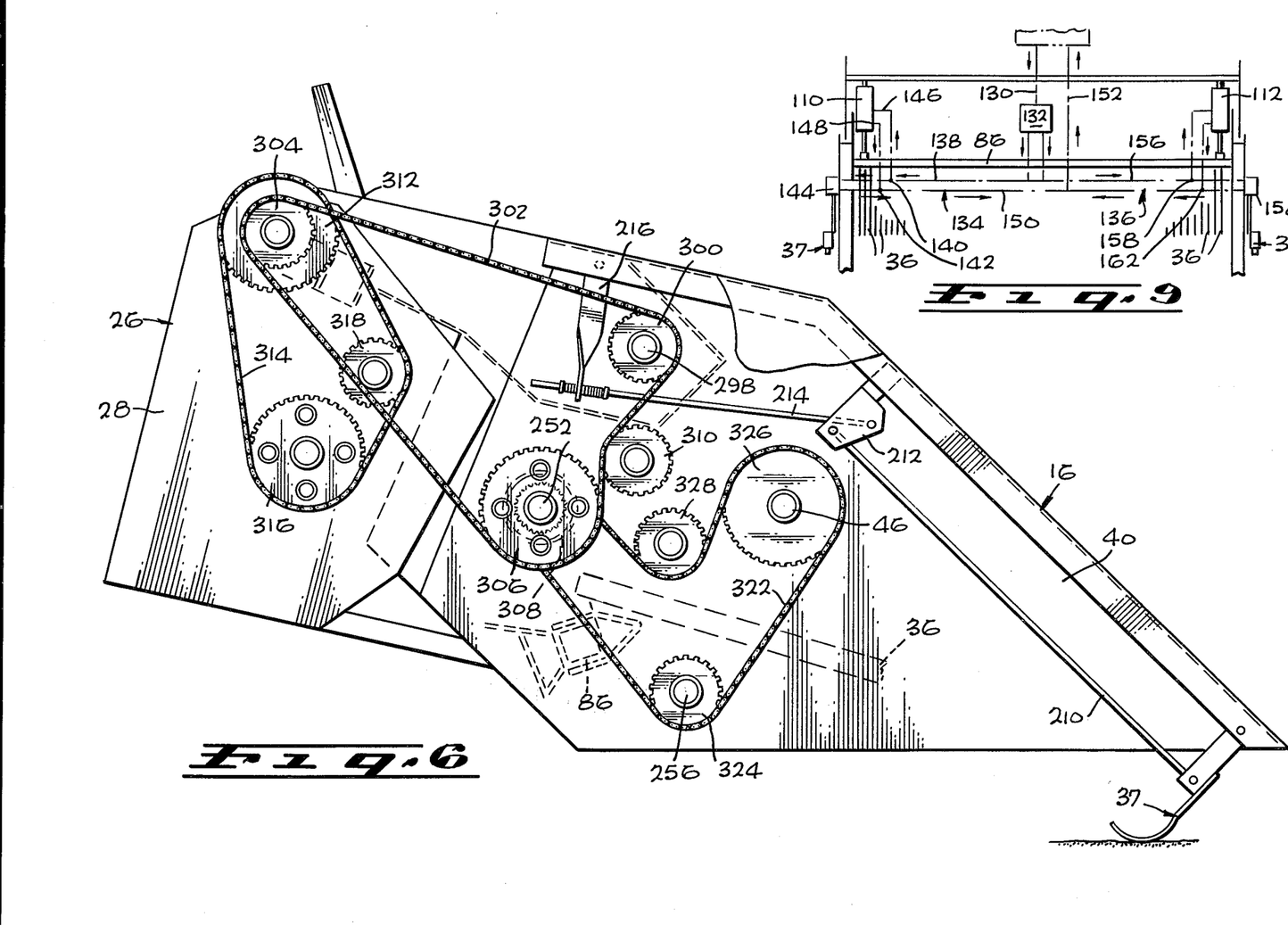
FIG. 6 is a right side view of the head and auger housing portion of FIG. 3 as seen from the line 6—6 of FIG. 1.
FIG. 9 is a plan view of the hydraulic system used to adjust the heights of the ends of the head of FIG. 3.

FIG. 9 illustrates the hydraulic system used to operate the cylinders 110 and 112 in response to the sensors 37 and 38 respectively. An incoming line 130 is coupled to the hydraulic system of the vehicle 12 to provide pressurized fluid to a flow divider 132. The flow divider 132 divides the fluid flow equally between first and second circuits 134 and 136. Fluid entering the circuit 134 from the flow divider 132 flows through a line 138 to a junction 140. The junction 140 is coupled to a second junction 142 through two different parallel paths. One of the paths includes the cylinder 110 and other path includes a valve 144 coupled to sensor 37. The junction 140 is coupled to the cylinder 110 at an inlet 146, and the junction 142 is coupled to the cylinder 110 at an outlet 148.

Fluid entering the cylinder 110 through the inlet 146 cannot exit from the outlet 148 until the cylinder 110 is extended by a predetermined amount. When the cylinder is extended by the predetermined amount fluid within the cylinder 110 exits through the outlet 148 to the junction 142 to prevent excessive pressure from building up within the cylinder 110. At all other times fluid enters the inlet 146 where, unable to escape from the cylinder, it creates a pressure determining the extent to which the cylinder 110 is extended. The pressure is determined by the valve 144 which is coupled to the junction 140 in parallel with the cylinder 110. The valve 144 provides a varying amount of resistance to the flow of fluid between the junctions 140 and 142 as determined by the position of the sensor 37. The greater the resistance provided by the valve 144 the greater is the fluid pressure within the cylinder 110 and thus the length of the cylinder 110.

The junction 142 is coupled by a line 150 to a common outgoing line 152 which returns the hydraulic fluid to the vehicle 12.

The circuit 136 is identical to the circuit 134 except that it varies the length of the cylinder 112 in response to a valve 154 operated by the sensor 38. A line 156 couples the flow divider 132 to a junction 158. Another line 160 couples the outgoing line 152 to a junction 162. The junctions 158 and 162 are coupled to one another through parallel paths, one of which includes the cylinder 112 and the other of which includes the valve 154. As in the case of the circuit 134, movement of the height sensor 38 to increase the fluid flow resistance of the valve 154 results in a buildup in pressure in and an increase in the length of the cylinder 112, and vice versa.

It will therefore be seen that the circuits 134 and 136 operate essentially independently of one another to vary the lengths of the cylinders 110 and 112 in response to the sensors 37 and 38 respectively. Since the sensors 37 and 38 operate independently of one another the cylinders 110 and 112 can, and in accordance with the invention do, vary in length by differing amounts, resulting in twisting of the generally planar array of fingers 36 about the axis defined by the elongated tube 86.

The manner in which the sensor 38 is coupled to the valve 154 is shown in detail in FIG. 4. As seen in FIG. 4 the sensor 38 is comprised of an elongated member 170 pivotably mounted at one end thereof to the end 42 of the head housing 44 at the end 34 of the finger assembly at or adjacent the harvesting axis 98. The opposite end of the member 170 is pivotably coupled to one end of a rod 172 and has a curved feeler 174 extending therefrom into contact with the surface of the ground. The opposite end of the rod 172 is pivotably coupled to a crank 176 which is itself pivotably mounted on an outer edge 178 of the end 42. The crank 176 also pivotably mounts one end of a rod 180 having an opposite end 182 coupled to one end of an elongated crank 184 by a stop 186 secured to the rod 180 and a spring 188 extending over the outside of the rod 180 between the stop 186 and the elongated crank 184. The opposite end of the crank 184 is pivotably mounted on a cylinder 190 within the end 42. As described hereafter the cylinder 190 is rotatable relative to the end 42 to vary the location of the pivot coupling of the crank 184 thereto and thereby vary the valve 154 for a given position of the sensor 38.

The valve 154 includes a spring-loaded plunger 192 the position of which varies the flow between an incoming line 196 from the junction 158 and an outgoing line 198 to the junction 162. The crank 184 pivots about the cylinder 190 in response to movement of the rod 180 to vary the depression of the plunger 192 within the valve 154 and thereby the flow resistance between the lines 196 and 198. The spring-loaded plunger 192 is normally urged outwardly in a direction away from the valve 154 to pivot the crank 184 to the left as seen in FIG. 4 and thereby extend the sensor 38 to its lowest possible position. This force combines with that of gravity to maintain the sensor 38 in contact with the ground at all times. As the level of the ground beneath the sensor 38 drops relative to the head 16 the sensor 38 pivots downwardly under the force of the plunger 192 as transmitted by the rods 172 and 180 to thereby decrease the flow resistance within the valve 154. As previously explained in connection with FIG. 9 this decreases the pressure in the cylinder 112 causing the cylinder to contract and thereby lower the end 34 of the finger array to accommodate the drop in the ground level adjacent thereto. Conversely, when the level of the ground adjacent the end 34 of the finger array rises, the sensor 38 is pivoted upwardly and to the right relative to the end 42 as seen in FIG. 4, and the resulting action of the rods 172 and 180 and the crank 176 pushes the lower end of the elongated crank 184 to the right as seen in FIG. 4 to depress the plunger 192 and increase the flow resistance within the valve 154. This causes a greater amount of fluid pressure to be concentrated in the cylinder 112 so as to extend the length thereof and lift the end 34 of the finger array relative to the support beam 118 which is a part of the vehicle frame 14.

The linkage between the sensor 37 and the valve 144 which is shown in FIG. 6 is identical to the linkage between the sensor 38 and the valve 154. The valve 144 is eliminated from FIG. 6 for simplicity, but is varied in accordance with the position of the sensor 37 as communicated by a rod 210, a crank 212, a rod 214 and an elongated crank 216.

Figure 7:
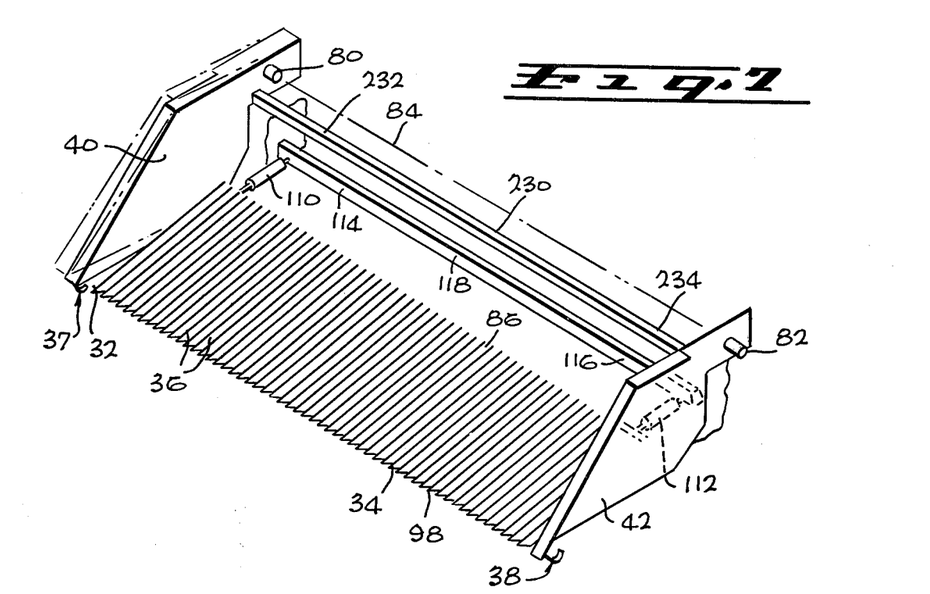
FIG. 7 is a perspective view of portions of the head and auger housing illustrating the manner in which the head undergoes twisting motion to accomplish height adjustment in accordance with the invention.
Figures 9, 10:
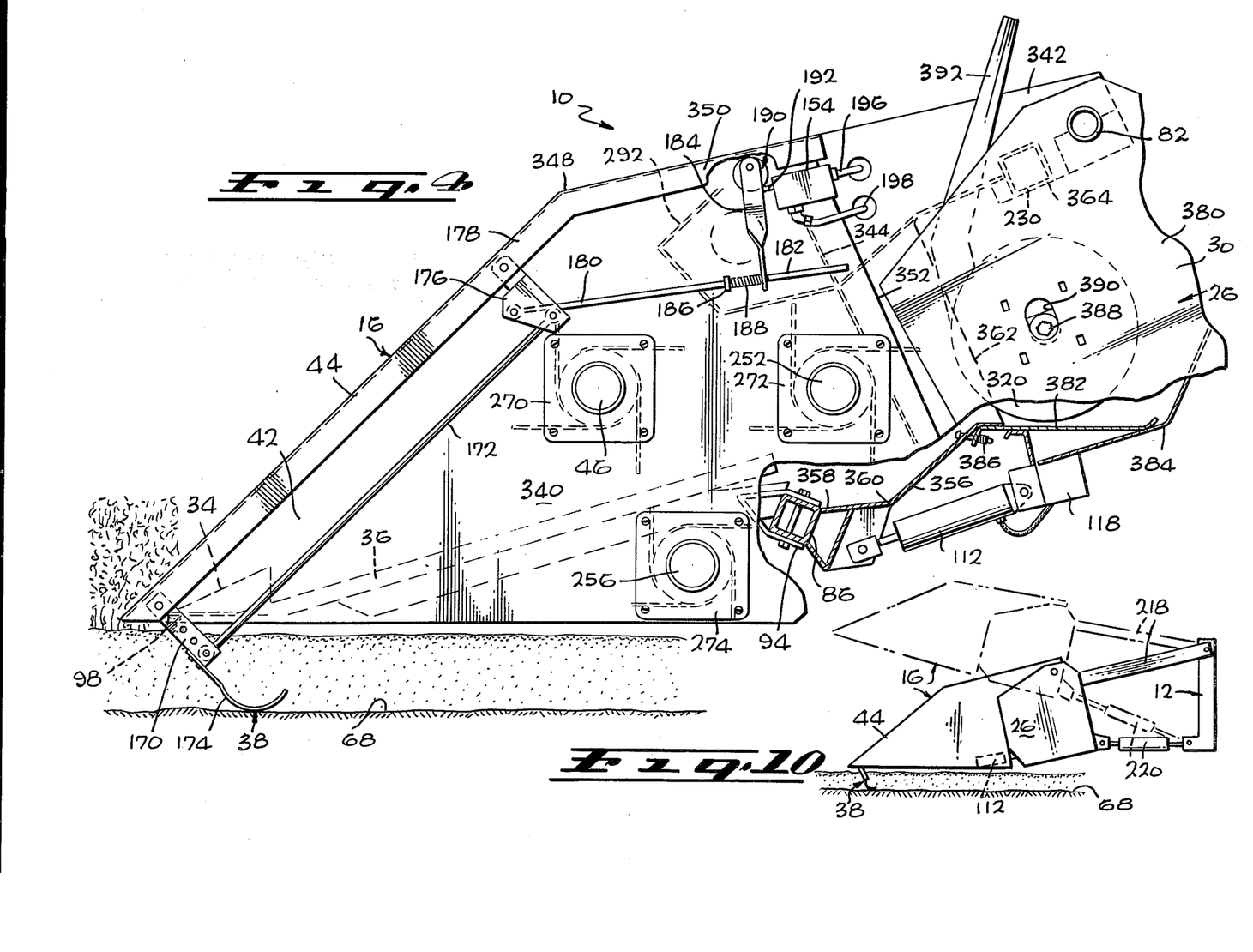
FIG. 10 is a side view of portions of the cotton stripper of FIG. 1 illustrating the manner in which basic height adjustment of the head is accomplished.

FIGS. 7 and 10 illustrate in perhaps greater clarity than the other figures the manner in which the height of the array of fingers 36 is determined. The array of fingers 36 is initially positioned at some nominal height by action of a pair of cylinders disposed between the vehicle 12 and the auger-containing housing 26. The housing 26 is attached to the ends of a pair of beams having opposite ends pivotably mounted on the vehicle 12. One such beam 218 is shown in FIG. 10. FIG. 10 also shows one of the cylinders 220 used to determine the initial nominal height of the head 16 and its included array of fingers. As shown in dotted outline in FIG. 10 the pair of cylinders including the cylinder 220 are lengthened by the application of pressure to raise the head 16 into an elevated position to provide for ample clearance between the head 16 and the ground such as when the vehicle is traveling to or from an area of cotton plants to be stripped. Reduction of the pressure in the cylinders shortens the cylinders, allowing the beam 218 to pivot downwardly and thereby lower the head 16 into a position in which the finger array assumes a nominal desired height above the ground. The pair of cylinders including the cylinder 220 causes the finger array to move uniformly as a planar configuration to achieve rough height adjustment. Thereafter, and as seen in FIG. 7 the height sensors 37 and 38 adjust the cylinders 110 and 112 as the cotton stripper travels over the ground to make minor changes in the opposite ends 32 and 34 of the assembly of fingers 36 either together or independently, as necessary, with the array of fingers twisting about the elongated tube 86 as required. Thus if the sensor 37 is moved upwardly by a rise in the ground level thereunder while the sensor 38 remains in the same position, the cylinder 110 is extended while the cylinder 112 remains unchanged. This causes the tube 86 to twist such that the end 40 of the head housing 44 pivots upwardly about the cylindrical pin 80 so as to assume the position shown in dotted outline in FIG. 7. When this happens, although it is not shown in FIG. 7, the array of fingers 36 twists such that the end 32 thereof is raised while the end 34 remains at the same elevation. This causes the harvesting axis 98 which is defined by the end 34 of the fingers 36 and which is normally parallel to the reference axis 84 defined by the pins 80 and 82 to assume a small angle relative to the reference axis 84.

The opposite ends 40 and 42 of the head housing 44 are free to pivot relative to one another about the reference axis 84 except for the presence of the elongated tube 86 and a further elongated tube 230 which is adjacent and generally parallel to the reference axis 84 and which has the opposite ends 232 and 234 thereof mounted on the opposite ends 40 and 42 respectively. The tube 230 adds some strength and rigidity to the overall structure of the head 16, yet twists relatively freely to permit relatively free pivoting motion of the ends 40 and 42 as required by the sensors 37 and 38. The elongated tube 230 which is not shown in FIG. 3 for reasons of clarity resides almost directly above the support beam 118 mounted on the opposite ends 28 and 30 of the auger-containing housing 26 and defining the reference surface for the cylinders 110 and 112. As described hereafter a pair of feeder shafts including the shaft 46 and a stalk walker shaft also extend between and are mounted on the opposite ends 40 and 42. However such shafts are journaled in universal bearings which permit rotation of the ends 40 and 42 independent of each other to provide twisting of the array of fingers 36.

Figure 3:
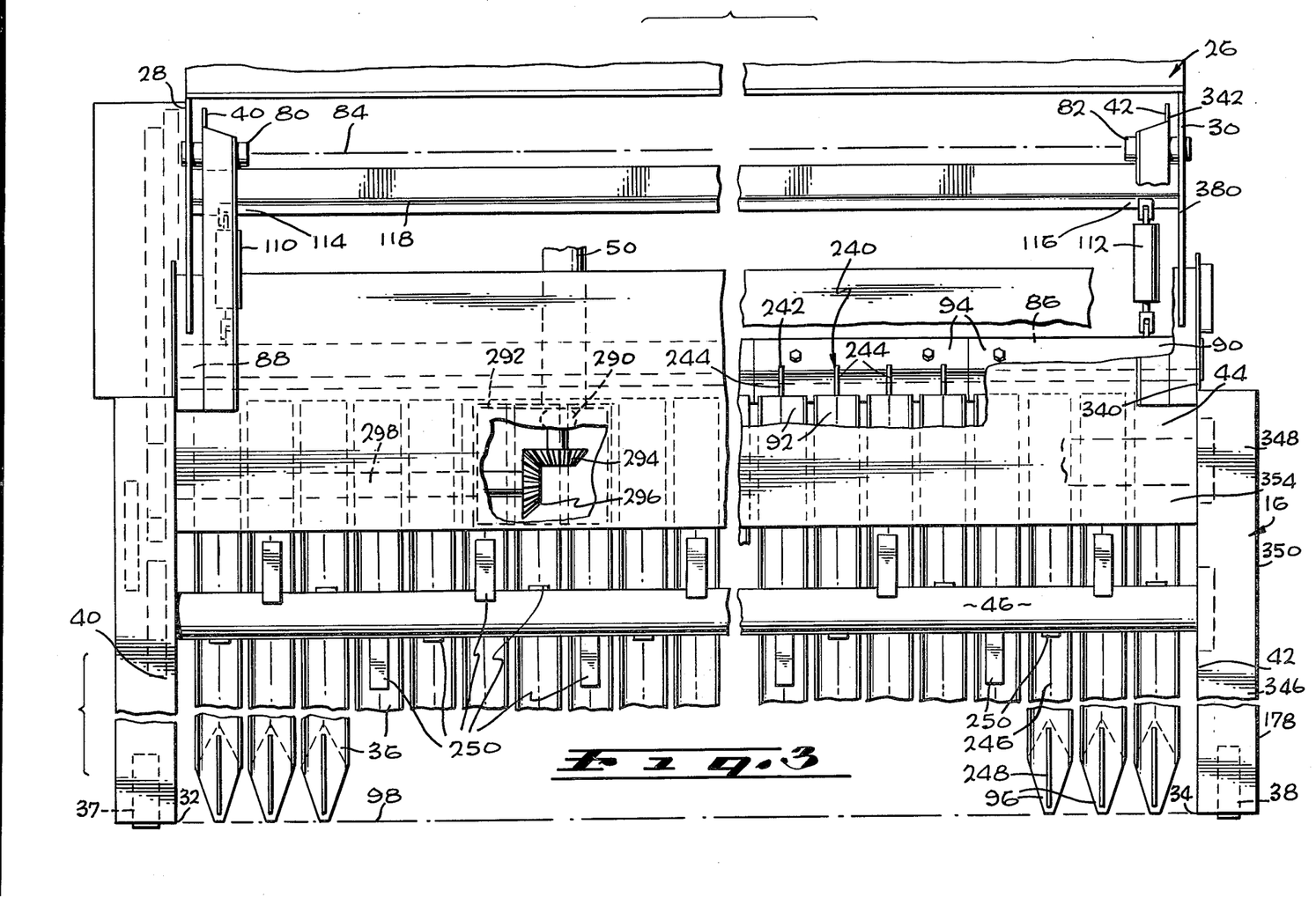
FIG. 3 is a top view of the head and a portion of the auger housing of the cotton stripper of FIG. 1.

As shown in FIGS. 3–5 each of the fingers 36 is comprised of a thin, planar element 240 having an end 242 thereof extending into a slot 244 in one of the brackets 94 secured to the elongated tube 86 to mount the finger on the tube 86. As shown in FIG. 3 each of the brackets 94 is provided with four of the slots 244 for receipt of the elements 240 of four of the fingers 36. Mounted on the top edge of and generally parallel with the element 240 is an elongated element 246 of generally V-shaped cross-section. The V-shaped cross-section of the element 246 forms a channel for cotton bolls as they are stripped from the plants, whereby the bolls are encouraged to migrate rearwardly to the auger within the housing 26. The end of the element 246 adjacent the bracket 94 defines the end 92 of the finger 36. The opposite end 96 of the finger 36 is formed by a portion of the element 246 which flattens out from the V-shaped cross-section and converges to a point. This portion of the element 246 is provided with a vertically extending element 248 which also converges to a point at the tip of the element 246. The resulting generally arrow-shaped front ends 96 of the finger 36 direct the cotton plants into the spaces between adjacent fingers as the plants are encountered.

As previously noted the feeder shaft 46 is disposed above the array of fingers 36 and is mounted on the opposite ends 40 and 42 of the housing 44 of the head. A plurality of elongated plates 250 are mounted spaced-apart along the length of the shaft 46 at locations 90° removed from one another and extend tangentially outwardly from the shaft 46. A second feeder shaft 252 provided with a plurality of plates 254 similar to the plates 250 extends between the opposite ends 40 and 42 of the housing 44 behind and generally parallel to the feeder shaft 46. A stalk walker shaft 256 extends between the opposite ends 40 and 42 of the housing 44 at a point below the fingers 36 and rearwardly of the feeder shaft 46 and forwardly of the feeder shaft 252. The stalk walker shaft 256 has a plurality of elongated plates 258 tangentially mounted on the outer surface thereof in the same manner as the plates 250 and 254 of the feeder shafts 46 and 252 respectively.

In operation the feeder shafts 46 and 252 and the stalk walker shaft 256 rotate in counterclockwise directions as seen in of FIGS. 4 and 5. The rotating plates 250 of the feeder shaft 46 aid in stripping the bolls from the cotton plants and advancing the bolls rearwardly along the fingers 36 as the plants are pulled along the spaces between the adjacent fingers 36. At the same time the plates 258 of the stalk walker shaft 256 aid in pulling the stalks of the cotton plants through the spaces between the fingers 36 as the stalks near the rearward ends 92 of the fingers 36 to facilitate removal of the cotton bolls while at the same time minimizing breakage of the stalks or pulling of the stalks out of the ground. The feeder shaft 252 and its included plates 254 functions in a manner similar to the shaft 46 but primarily to advance the stripped cotton bolls toward and into the auger within the housing 26.

Referring to FIG. 4 the feeder shaft 46 has one end thereof mounted in a universal bearing 270 which is in turn secured to the end 42. The bearing 270 is universal in a sense that it is of the type permitting the angle of the feeder shaft relative to the plane of the end 42 to vary in addition to permitting rotation of the shaft 46. The feeder shaft 252 is similarly journaled in a universal bearing 272 as is the stalk walker shaft 256 which is journaled in a universal bearing 274. Although not shown in FIG. 6 for reasons of clarity the opposite ends of the shafts 46, 252 and 256 are journaled in universal bearings in the other end 40 of the head housing 44. The universal bearings maintain the feeder shafts 46 and 252 and the stalk walker shaft 256 in desired locations relative to the fingers 36 while at the same time permitting some flexibility of the opposite ends 40 and 42 of the head housing 44 to permit twisting of the array of fingers 36.

As previously noted power is provided to the head 16 from the vehicle 12 via the drive shaft 50. Referring to FIGS. 3 and 5 it will be seen that the drive shaft 50 terminates in a universal joint 290 rotatably mounted in one wall of an enclosed, elongated box 292 which extends along a portion of the width of the head 16 between the drive shaft 50 and the end 40 of the head housing 44. The universal joint 290 is coupled to one of a pair of bevel gears 294 and 296 enabling driving power to be taken through a right angle bend and applied to a shaft 298 extending along the length of the box 292 and through the end 40 of the head housing 44. Consequently, rotation of the drive shaft 50 causes driving of the shaft 298.

Referring to FIG. 6 the shaft 298 has a sprocket 300 mounted thereon immediately outside of the end 40. A chain 302 which engages the sprocket 300 also engages a sprocket 304 mounted on the end 28 of the housing 26, a sprocket 306 coupled to the feeder shaft 252 together with a smaller sprocket 308 shown in dotted outline in FIG. 6, and an idler sprocket 310. Consequently, rotation of the shaft 298 provides driving of the sprockets 304 and 306. Rotation of the sprocket 306 drives the feeder shaft 252. Rotation of the sprocket 304 also rotates a larger sprocket 312 coupled thereto and to a chain 314. The larger sprocket 312 effects a change in gear ratio. The chain 314 extends around a sprocket 316 and an idler sprocket 318. The sprocket 316 is coupled to an auger 320 which resides within the housing 26 as shown in FIG. 4. Consequently, rotation of the sprocket 304 in response to driving of the chain 302 results in driving of the auger 320 via the sprocket 316.

Rotation of the sprocket 306 results in driving of the feeder shaft 46 and the stalk walker shaft 256 in addition to the feeder shaft 252. This is accomplished by a chain 322 which is coupled to the sprocket 308 mounted on the back of the sprocket 306. The chain 322 also engages a sprocket 324 coupled to the stalk walker shaft 256, a sprocket 326 coupled to the feeder shaft 46 and an idler sprocket 328.

Referring to FIGS. 3 and 4 the end 42 of the head housing 44 is principally comprised of a first thin, planar panel 340 and a second thin, planar panel 342 disposed offset from and parallel to the panel 340 by a strip-like member 344 shown in dotted outline in FIG. 4. The panel 340 mounts the bearings 270, 272 and 274 for the feeder and stalk walker shafts, the connecting linkage between the sensor 38 and the valve 154 and the elongated tube 86. The front and upper edges 346 and 348 respectively of the panel 340 extend outwardly in a direction normal to the plane of the panel 340, the front edge 346 of the panel terminating in the outer edge 178 and the upper edge 348 of the panel terminating in an outer edge 350. A cover plate (not shown) of essentially the same size and shape as the panel 340 is mounted on the edges 178 and 350 so as to extend in parallel, spaced-apart relation to the panel 340 and enclose the various components such as the bearings 270, 272 and 274 and the linkage between the sensor 38 and the valve 154. The rear portion of the panel 340 terminates in an edge 352 shown in FIG. 4.

As shown in FIG. 3 a top cover 354 extends between and is fastened to the opposite ends 40 and 42 of the housing 44. At the end 42 the cover 354 is secured to the inside surface of the panel 340. The position of the cover 354 is shown in dotted outline in FIG. 5. Referring to FIG. 4 a floor panel 356 has a front edge 358 thereof secured to the elongated tube 86 along the length of the tube 86. The floor panel 356 which has a bend 360 therein extends across the width of the head and is secured to the opposite ends 40 and 42. In the case of the end 42 shown in FIG. 4 the floor panel 356 is secured to the inside surface of the panel 340. The floor panel 356 contains the cotton bolls as they are advanced rearwardly from the fingers 36 and toward the auger 320.

The thin, planar panel 342 forming a part of the end 42 has a front edge generally coincident with the strip-like member 344 and a back edge which extends upwardly as shown by the dashed line 362 in FIG. 4 and then over as shown by the dashed line 364 to mount the elongated tube 230 and the cylindrical pin 82.

The end 30 of the auger-containing housing 26 includes a thin, planar panel 380 disposed outside of, spaced-apart from and parallel to the panel 342 of the end 42 of the head housing 44. A floor panel 382 has one end thereof fastened to the inside surface of the panel 380 as does a further floor panel 384. The floor panels 382 and 384 extend across the width of the auger-containing housing 26 where they are secured in like fashion to the opposite end 30. As seen in FIG. 4 the floor panel 382 is loosely secured to the floor panel 356 of the head housing 44 by screw and spring arrangements 386 which maintain contact between the adjacent floor panels while permitting movement of the head housing 44 relative to the auger-containing housing 26 as the cylinders 110 and 112 are varied. The floor panel 382 rests on top of and is capable of sliding relative to the floor panel 384 which extends rearwardly of the auger 320. The floor panels 382 and 384 contain the cotton bolls residing in the region of the auger 320, permitting the bolls to be advanced to the center of the housing 26 by the auger 320 for transmission via the chute 48 to the storage bin 20 of the cotton stripper.

The auger 320 includes a shaft 388 journaled within a movable bearing on the inside of the thin, planar panel 380. The opposite end of the shaft 388 is similarly journaled in the opposite end 28 of the housing 26. An elongated aperture 390 in the panel 380 permits the shaft 388 to move upwardly with the bearing in response to manual actuation of a handle 392 to clear the auger 320 in the event it becomes jammed.

The ends 28 and 40 of the housings 26 and 44 respectively are constructed in the same manner as the ends 30 and 42.

Figure 8:
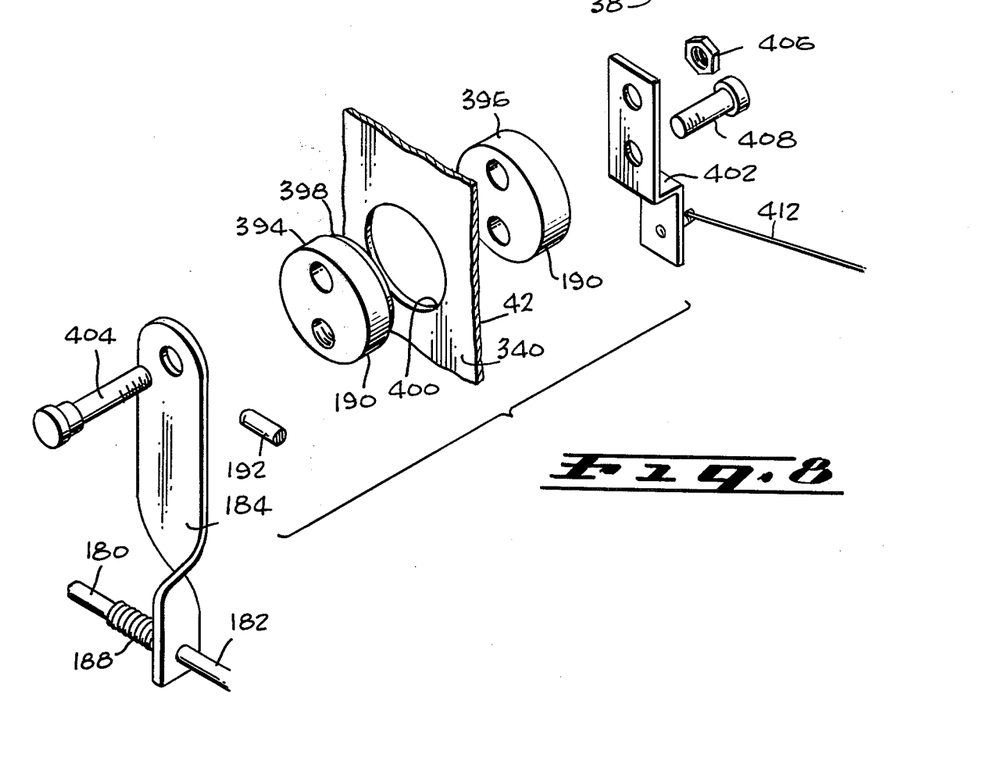
FIG. 8 is an exploded perspective view of an arrangement for adjusting the heights of the ends of the head in response to external commands and independently of the height sensors mounted on the head.

As previously noted in connection with FIG. 4 the elongated crank 184 forming a part of the linkage between the sensor 38 and the valve 154 is pivotably mounted on the cylinder 190. As shown in FIG. 8 the cylinder 190 is comprised of an opposing pair of cylindrical elements 394 and 396 disposed on opposite sides of the thin, planar panel 340 comprising the end 42 of the housing. The cylindrical element 394 has a portion 398 thereof of reduced diameter so that it may fit within a circular aperture 400 in the panel 340. A crank 402 is disposed on the opposite side of the cylinder 190 from the crank 184 and inside the panel 340.

The assembly of FIG. 8 is joined together by a bolt 404 extending through an aperture in the end of the crank 184, through apertures in the cylindrical elements 394 and 396 and through an aperture in the crank 402 where the bolt is secured by a nut 406. A second bolt 408 extends through a different aperture in the crank 402 and through a different pair of apertures in the cylindrical elements 394 and 396. The threaded end of the bolt 408 is secured by threads within the aperture in the cylindrical element 394 to hold the bolt in place. In the resulting arrangement the cylinder 190 formed by the elements 394 and 396 resides within the aperture 400 and is free to rotate relative to the panel 340. The crank 402 is secured to the back side of the cylinder 190 and must rotate with the cylinder. Consequently movement of a cable 412 coupled to the crank 402 causes rotation of the cylinder 190 within the aperture 400. Since the upper pair of apertures in the elements 394 and 396 forming the cylinder 190 define the pivot point of the elongated crank 184, rotation of the cylinder 190 changes the proximity of the crank 184 relative to the plunger 192 of the valve 154 for a given position of the height sensor 38. By manipulating the cable 412 and another cable coupled to an identical arrangement at the opposite end 40, the operator of the cotton stripper can adjust the array of fingers 36 independent of the sensors 37 and 38 and at the same time can adjust the sensitivity of or in effect calibrate the two sensors independent of each other.

While the invention has been particularly shown and described with reference to a preferred embodiment thereof, it will be understood by those skilled in the art that various changes in form and details may be made therein without departing from the spirit and scope of the invention.

What is claimed is:

1. A crop treating vehicle having a movable frame, a crop treating head, the head having crop treating means adjacent a front end thereof and being adjustably mounted on the frame at a rear end thereof opposite the front end to position the head at a selected basic height, said head being of integral, non-pivotable construction along the length thereof between the front and rear ends thereof, said vehicle including means for twisting the head along the length thereof between the front and rear ends thereof to change the angle of the front end relative to the rear end and thereby vary the relative heights of the opposite sides of the front end of the head.

2. The invention set forth in claim 1, wherein the head includes a plurality of generally parallel cotton stripping fingers extending outwardly from the front end between the opposite sides of the front end.

3. The invention set forth in claim 1, wherein the head is pivotably coupled at opposide side of the rear end thereof for up and down movement relative to the frame, the frame defines a reference surface adjacent the rear end of the head, and the means for twisting the head includes a pair of hydraulic cylinders disposed between and coupled to the frame at the reference surface and the head at the opposite sides of the rear end thereof, and means for actuating the pair of hydraulic cylinders independently of one another.

4. The invention set forth in claim 3, wherein the means for actuating the pair of cylinders includes a pair of sensors mounted at the opposite sides of the front end of the head and each responsive to the height of the side of the front end of the head at which it is mounted for controlling one of the cylinders.

5. A crop harvester comprising the combination of a wheeled vehicle for traversing ground having crops to be harvested, frame means extending from the vehicle and having a pair of pivot points spaced-apart along the length of and defining a reference axis and a head assembly mounted on the frame means and including a pair of opposite end panels, each pivotably mounted on the frame means at a different one of the pivot points, an elongated mounting member disposed generally parallel to the reference axis and having the opposite ends thereof attached to the opposite end panels, a plurality of transversely spaced crop harvesting members mounted on the mounting member along the length thereof, said crop harvesting members extending forwardly from the mounting member on the opposite side of the mounting member from the reference axis and terminating in outer ends which lie along a harvesting axis normally parallel to the reference axis and the mounting member, and a pair of support means disposed between and coupled to the frame means and the mounting member adjacent the opposite ends of the mounting member, each of the pair of support means being variable in length independent of the other one of the pair of support means to twist the mounting member and thereby change the angle of the harvesting axis relative to the mounting member and the reference axis.

6. The invention set forth in claim 5, wherein each of the pair of support means comprises a hydraulic cylinder coupled to a source of pressurized fluid, and further including a pair of height sensors, each mounted on a different one of the opposite end panels adjacent the harvesting axis and coupled to a different one of the hydraulic cylinders to control said different one of the hydraulic cylinders independent of the other hydraulic cylinder in accordance with the height of the harvesting axis at the height sensor relative to the ground.

7. The invention set forth in claim 5, wherein the crop harvesting members comprise cotton stripper fingers mounted in parallel, spaced-apart relation along the length of the mounting member and having tips at the ends thereof opposite the mounting member which lie along and define the harvesting axis.

8. The invention set forth in claim 7, further including a stalk walker shaft disposed beneath the fingers and generally parallel to the reference axis and the mounting member and having opposite ends rotatably mounted on the opposite end panels, a plurality of elongated plates tangentially mounted on the outer surface thereof along the length thereof, at least one feeder shaft disposed above the fingers and generally parallel to the reference axis and the mounting member and having opposite ends thereof rotatably mounted on the opposite end panels, a plurality of elongated plates tangentially mounted on the outer surface thereof along the length thereof, and an auger assembly rotatably mounted within the frame means adjacent the head assembly and generally parallel to the reference axis.

9. The invention set forth in claim 8, wherein the end panels are generally planar in configuration and the stalk walker shaft and the feeder shaft are mounted on the end panels in flexible bearings which permit changes in the angles of the planes of the end panels relative to the axes of elongation of the stalk walker shaft and the feeder shaft.

10. A crop harvesting head for use with a vehicle having height adjustable head mounting means comprising a frame having an elongated mounting member and a pair of opposite end members fastened to opposite ends of the elongated mounting member, each of the opposite end members being adapted to be pivotably coupled to a head mounting means of a vehicle, a plurality of crop harvesting members mounted on the mounting member along the length thereof between the opposite end members, a plurality of adjustable support elements having a variable length between opposite ends thereof, each of the support elements having a variable length between opposite ends thereof, each of the support elements having one end coupled to the mounting member and the opposite end adapted to be coupled to a head mounting means of a vehicle, and means coupled to the support elements for selectively varying the length of each support element independently of other support elements.

11. The invention set forth in claim 10, wherein the crop harvesting members comprise a plurality of cotton stripping fingers mounted in parallel, spaced-apart relation along the length of the mounting member.

12. The invention set forth in claim 11, wherein there are two support elements coupled to the mounting member at opposite ends thereof adjacent the end members, the fingers have ends opposite the mounting member which lie along a line extending between the opposite end members and the means for selectively varying the length of each support element includes a height sensor mounted on the adjacent end member at a location adjacent said line and operative to sense the height of said line at the end members above ground.

13. The invention set forth in claim 12, wherein the support elements comprise hydraulic cylinders and the means for selectively varying the length of each support element includes a valve coupled to be controlled by a different one of the height sensors, a common source of pressurized fluid, means coupled to the common source for dividing the common source into two different flows of pressurized fluid, and means coupling each of the two different flows to one of the valves and one of the hydraulic cylinders.

14. The invention set forth in claim 13, wherein the means coupling each of the two different flows to one of the valves and one of the hydraulic cylinders includes a first line coupling one of the two different flows to one of the cylinders and one of the valves and a second line coupled to said one of the valves for return fluid from said one of the valves.

15. The invention set forth in claim 14, wherein each cylinder includes a movable piston, a fluid inlet and a fluid outlet communicating with the fluid inlet whenever fluid entering the fluid inlet moves the piston a predetermined distance and the first line is coupled to the fluid inlet, and further including a third line coupling the fluid outlet to the second line.

16. The invention set forth in claim 14, further including means for controlling each valve independently of the height sensors in response to external signals.

17. A cotton stripper comprising a self-powered vehicle having means for storing cotton, frame means extending upwardly from the vehicle, a first elongated hollow housing transversely coupled to an outer end of the frame means opposite the vehicle, the frame means being movable relative to the vehicle to vary the height of the hollow housing, an auger rotatably mounted within the hollow housing, conveying means extending from the auger to the means for storing cotton, a second elongated hollow housing disposed generally parallel to and pivotably mounted on the first-mentioned hollow housing at the opposite ends of the first-mentioned and the second hollow housing, an elongated twistable bar having the opposite ends thereof mounted on the opposite ends of the second hollow housing, a plurality of cotton stripping elements mounted along the length and extending forwardly from the bar to form a generally planar array having an edge opposite the bar, a plurality of rotatable feeder and stalk walker shafts extending between and rotatably mounted on the opposite ends of the second hollow housing adjacent the cotton stripping elements, each of the feeder and stalk walker shafts having a plurality of elongated plates tangentially mounted on the outer surface thereof along the length thereof, and means responsive to the height of the opposite ends of said edge of the planar array for selectively twisting the bar to deform the planar array and tilt said edge of the planar array relative to the bar.

18. The invention set forth in claim 17, wherein the means for selectively twisting the bar includes a pair of height sensors mounted on the second hollow housing at the opposite ends of said edge of the planar array, a pair of valves, each coupled to be varied by a different one of the height sensors, a pair of cylinders extending between the first hollow housing and the second hollow housing adjacent the opposite ends of the bar, a source of pressurized fluid, first conduit means extending from the source to one of the cylinders and one of the valve means and back from said one of the valve means to the source, and second conduit means extending from the source to the other one of the cylinders and the other one of the valve means and back from said other one of the valve means to the source.

19. The invention set forth in claim 17, wherein the means for selectively twisting the bar includes a pair of height sensors mounted on the second hollow housing at the opposite ends of said edge of the planar array, a pair of valves, each having an inlet and an outlet and being operative to vary fluid flow between the inlet and the outlet in accordance with height sensed by a different one of the height sensors, a source of pressurized fluid having an inlet and outlet, a pair of cylinders extending between the first hollow housing and the second hollow housing adjacent the opposite ends of the bar and each having an inlet coupled to vary the length of the cylinder in accordance with fluid pressure applied thereto, a first pair of conduits coupling the outlet of the source to the inlets of different ones of the pair of valves, a second pair of conduits coupling the outlets of different ones of the pair of valves to the inlet of the source, and a third pair of conduits coupling different ones of the first pair of conduits to the inlets of different ones of the pair of cylinders.

20. The invention set forth in claim 19, wherein each of the pair of cylinders has an outlet which is directly coupled to the inlet thereto whenever the length of the cylinder has increased a predetermined amount and further including a fourth pair of conduits coupling different ones of the second pair of conduits to the outlets of different ones of the pair of cylinders.

21. The invention set forth in claim 19, further including means responsive to external commands for varying fluid flow between the inlets and the outlets of the pair of valves independent of the height sensors.

22. The invention set forth in claim 21, wherein each of the valves has a plunger which is depressable to vary the fluid flow between the inlet and the outlet, each of the height sensors includes an element rotatable about a pivot point to contact and depress the plunger in response to the height sensed by the height sensor, and the means responsive to external commands for varying the fluid flow includes means for moving the pivot point of the element relative to the plunger.

23. The invention set forth in claim 22, wherein the element is elongated and has the pivot point at one end thereof, a height sensing rod coupled to the other end thereof and operative to rotate the element about the pivot point in response to height changes and a portion intermediate the one end and the other end which bears against the plunger, and the means for moving the pivot point of the element relative to the plunger includes a rotatably mounted cylindrical member having the one end of the element pivotably mounted thereon at the outer periphery thereof, and an elongated crank having one end affixed to the cylindrical member and an opposite end extending away from the cylindrical member, and means coupled to the opposite end of the crank for pulling the crank to cause rotation of the cylindrical member and movement of the pivot point and the coupled element relative to the plunger.

24. A cotton stripper comprising a self-powered vehicle having pairs of front and rear wheels, a storage container, a frame having one end thereof pivotably mounted on the vehicle and extending forwardly from the region of the pair of front wheels to an opposite end, means for pivoting the frame about the one end to position the opposite end a selected height above ground, a first elongated hollow housing transversely mounted on the opposite end of the frame and including a first pair of generally parallel, spaced-apart side elements, a first floor element extending between and joined to the first pair of side elements, an auger rotatably mounted between the pair of side elements above the first floor element and an elongated cylinder mounting element extending along and coupled to the underside of the first floor element between the first side elements, conveyor means coupling the inside of the first hollow housing in the region of the auger to the storage container, a second hollow frame member having a second pair of parallel, spaced-apart side elements disposed adjacent and parallel to the first pair of side elements and pivotably coupled thereto at an opposite pair of pivot points, a second floor element extending between and joined to the second pair of side elements and flexibly joined to the first floor element and an elongated tube extending between and mounted on the second pair of side elements and coupled to the second floor element, a plurality of transversely spaced cotton stripping fingers having first ends mounted on the tube along the length thereof and opposite forwardly disposed second ends lying along a line extending between a pair of height sensing points on the second pair of side elements, a pair of height sensors mounted on the second pair of side elements at the pair of height sensing points, a pair of cylinder mounting brackets secured to the tube at the opposite ends thereof adjacent the second pair of side elements, a pair of cylinders extending between and mounted on the cylinder mounting brackets and the cylinder mounting element, first control means responsive to one of the pair of height sensors for varying the length of the one of the pair of cylinders adjacent the side element on which said one of the height sensors is mounted, second control means responsive to the other one of the pair of height sensors for varying the length of the one of the pair of cylinders adjacent the side element on which said other one of the height sensors is mounted, a stalk walker shaft extending between the fingers and between and rotatably mounted on the second pair of side elements by a flexible bearing arrangement, and at least one feeder shaft extending above the fingers and between and rotatably mounted on the second pair of side elements by flexible bearing arrangements.

25. The invention set forth in claim 24, further including rotatable drive means extending along the frame from the vehicle to the first and second hollow housings and an arrangement of belts and pulleys mounted on one of the first pair of side elements and one of the second pair of side elements and coupled to be driven by the rotatable drive means and to drive the auger, the stalk walker shaft and the at least one feeder shaft.

* * * * *